United States Patent [19]

Bader et al.

[11] Patent Number: 5,427,516

[45] Date of Patent: Jun. 27, 1995

[54] DEVICE FOR DETECTING MATERIAL STRESSES IN MOULDINGS AND CASTINGS

[75] Inventors: Christopherus Bader, Neftenbach; Paul Engeler, Frauenfeld, both of Switzerland

[73] Assignee: K.K. Holding AG, Winterthur, Switzerland

[21] Appl. No.: 139,040

[22] Filed: Oct. 21, 1993

[30] Foreign Application Priority Data

Oct. 23, 1992 [CH] Switzerland ............ 03 291/92

[51] Int. Cl.$^6$ ............................................ B29C 45/77
[52] U.S. Cl. ............................ 425/149; 264/40.3; 424/555
[58] Field of Search ............ 425/149, 555; 264/40.3

[56] References Cited

U.S. PATENT DOCUMENTS

| | | | |
|---|---|---|---|
| 3,767,339 | 10/1973 | Hunkar | 425/149 |
| 3,840,312 | 10/1974 | Paulson et al. | 425/149 |
| 3,893,792 | 7/1975 | Laczko | 425/149 |
| 4,100,598 | 7/1978 | Stiel et al. | 425/149 |
| 4,208,176 | 6/1980 | Salerno | 425/149 |
| 4,240,996 | 12/1980 | Hunkar | 425/149 |
| 4,314,481 | 2/1982 | Wolfer et al. | |
| 4,354,131 | 10/1982 | Kaji | 310/328 |
| 4,411,609 | 10/1983 | Yoshii et al. | 425/149 |
| 4,651,120 | 3/1987 | Aagard | 338/4 |
| 4,735,760 | 4/1988 | Kumazaki | 425/149 |
| 4,824,620 | 4/1989 | Casa et al. | 425/149 |
| 4,833,910 | 5/1989 | Kenmochi | 425/149 |
| 5,249,163 | 9/1993 | Erickson | 367/149 |

FOREIGN PATENT DOCUMENTS

| | | |
|---|---|---|
| 012867 | 7/1980 | European Pat. Off. . |
| 266452 | 5/1988 | European Pat. Off. . |
| 4129701 | 3/1993 | Germany . |
| 023831 | 5/1982 | Japan . |
| 032134 | 5/1989 | Japan . |

OTHER PUBLICATIONS

Z. Huaipu, A New Method for Measurement of Three Dimensional Residual Stresses in a Multi-Pass Butt Welded Joint, Feb. 1992.

C. Cavalloni, et al., New Piezoelectric Transducers for Internal Strain Measurement, Mar., 1990.

*Primary Examiner*—Tim Heitbrink
*Attorney, Agent, or Firm*—Barnes & Thornburg

[57] ABSTRACT

A device which is capable of measuring both the viscous injection/casting operation and the shrinkage during the solidification phase, using a suitable measuring device. For this a sensor is fitted in the mould at the critical point expected, with a measuring surface that is flush with the inner wall and is able to measure shear and compressive stresses, so that for the first time the shrinkage phenomenon becomes measurable. With this, a new dimension of quality monitoring becomes possible.

23 Claims, 5 Drawing Sheets

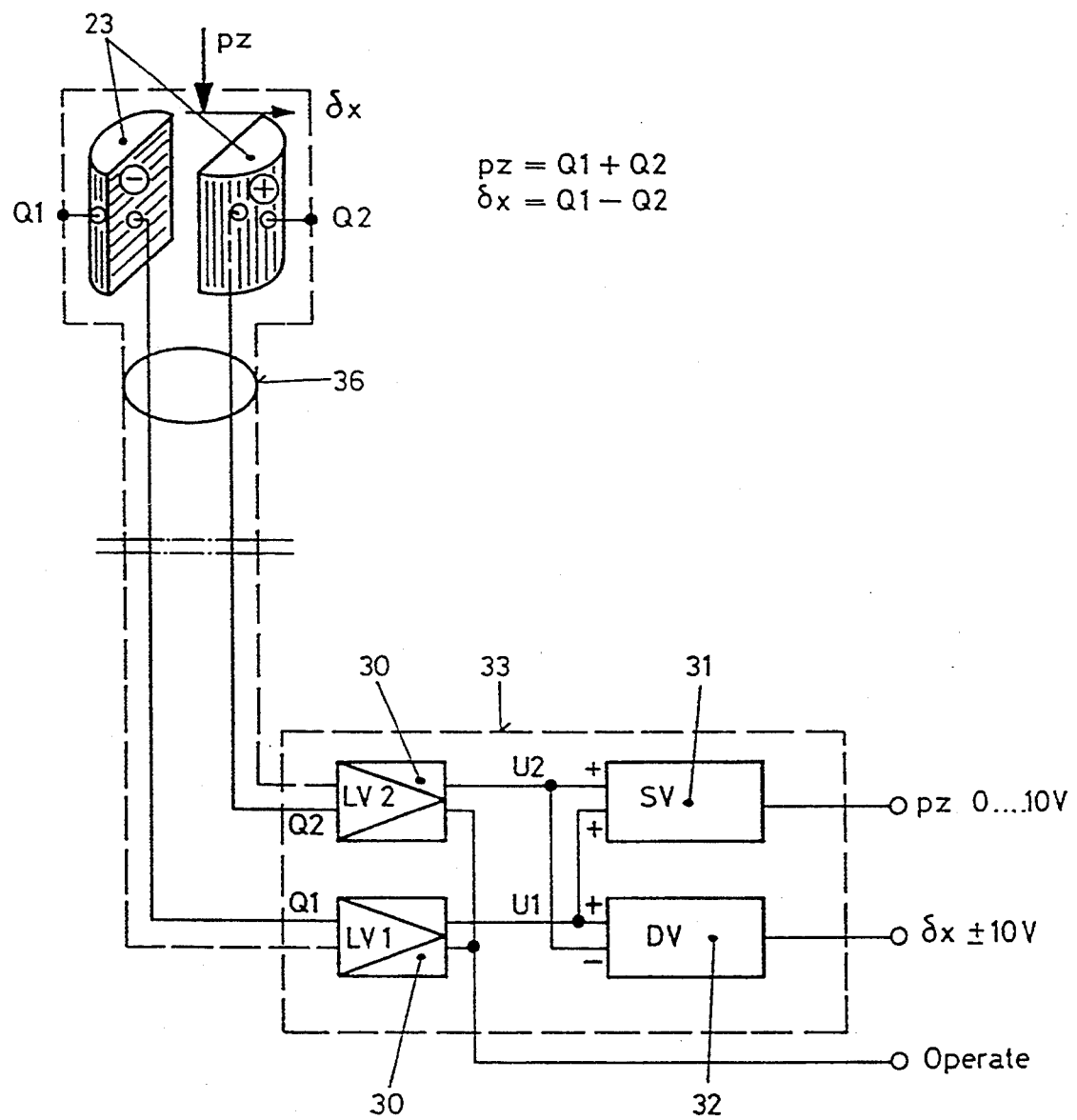

DEVICE FOR DETECTING MATERIAL STRESSES IN MOULDINGS AND CASTINGS

BACKGROUND AND SUMMARY OF THE INVENTION

In the processing of plastics, metals, alloys etc., internal stresses occur during solidification. They are largely retained in the finished moulding or casting, and are responsible for quality deterioration. These stresses are concentrated at certain places in a cast, injection-moulded or pressed part, and are caused mainly by unequal shrinkages during solidification.

Hitherto it has not been possible to detect such stresses non-destructively, neither during the production process nor after completion of the finished product.

At the present time, internal material stresses can be measured only with a complex drilling technique, and only to a limited extent. The suspected critical stress point is drilled out in stages. During this operation, the surroundings are tested for stress changes with strain gauges applied. It is thus possible today to assess internal stresses resulting from the production process only by destroying the casting or moulding. This is a lengthy and costly procedure.

The device according to the invention uses new approaches to measure, for the first time, the shrinkage or expansion process during the solidification of the casting or moulding in its mould. The solidification process (i.e. the transition from liquid or viscous to the solid state) is accompanied by crystal transformations and hence volume changes is known. In metal powder injection moulding (MIM), the shrinkage factor may amount to as much as 20%.

That the accompanying shrinkage or expansion (for example when water freezes into ice) can cause considerable stresses in the casting or moulding is also well known. Knowledge of these stress processes and means of monitoring them thus open up new possibilities for quality control.

New and in accordance with the invention therefore is the utilization of this exactly limited phenomenon in time during the production process to measure the changes in the stresses at predetermined points on the inner wall of the injection or casting mould. A measuring device has a measuring surface fitted into the injection or casting mould flush with the workpiece surface, so that this can move freely in all three orthogonal directions, i.e. it is separated from the mould wall by a minimal air gap. This air gap is so small that the material cannot pass through it in liquid or viscous state, even though it is under high pressure. The gap width depends on the viscosity of the fluid material, and can be determined by empirical tests. The measuring surface of the device is preferably the front face of a sensor screwed into the mould, which measures shear and compressive forces and is able to convert these into voltage changes with the appropriate electronics. However other measuring surfaces are conceivable and in accordance with the invention.

In the figures that follow, the invention is represented as a typical application in plastics injection moulding technology. However the invention is also applicable in metal pressure die-casting and injection moulding, and in a number of other processes where shrinkage phenomena have to be detected.

The process and device will be explained with reference to the figures.

BRIEF DESCRIPTION OF THE DRAWINGS

FIG. 12 Measuring rig and electrical circuitry for a two-component sensor pz, δx.

DETAILED DESCRIPTION OF THE DRAWINGS

Figure 1:
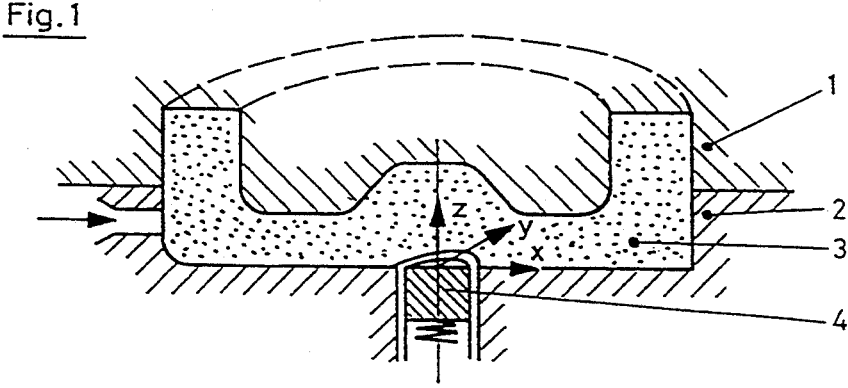
FIG. 1 Section through a plastic injection mould with moulding and measuring device.

FIG. 1 shows a section through a plastic injection mould, where 1 is the upper part of the mould, 2 the lower part, 3 the injection moulding or workpiece. The measuring device 4 is a cylindrical piece isolated from the wall of the mould, mounted with its face flush with the workpiece surface and sensitive in the three coordinate axes X, Y and Z.

Figure 2:
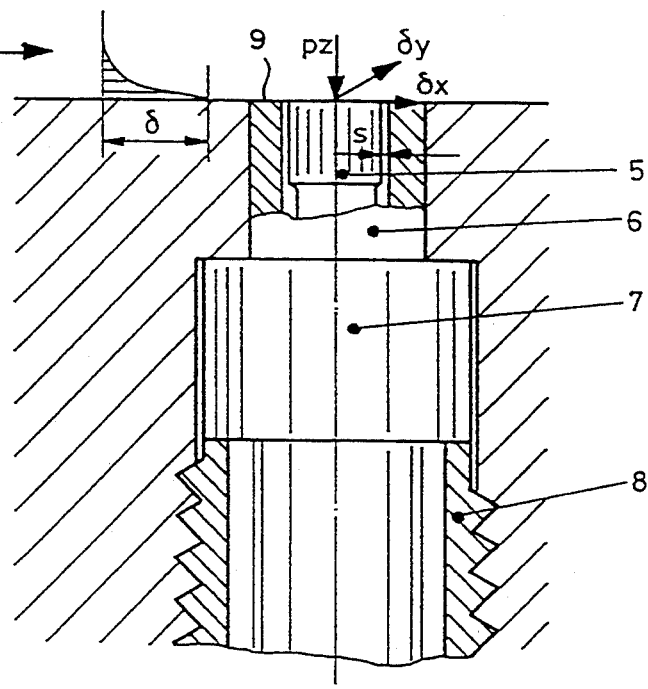
FIG. 2 A device in the form of a screw-in sensor for detecting one compressive and two shear stresses, δx and δy.

FIG. 2 shows the front part of the measuring device 4 clearly. The sensor head 5 is positioned in the sensor sleeve 6 with the clearance S and supported on the sensor 7. By means of the screw thread 8, the sensor 7 is fitted in the lower mould part 2 for example. The shear stress δ reaches maximum values along the mould wall. By way of example, the measuring surface 9 is shown as a plane surface at right angles to the sensor axis, but it may also have more than one surface or be non-plane.

Figure 3:
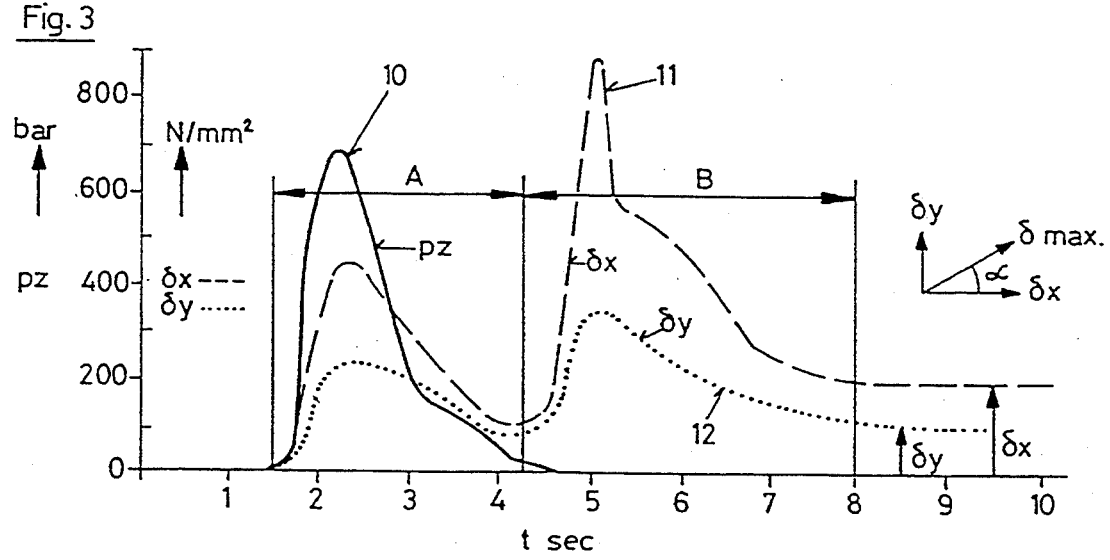
FIG. 3 A measuring diagram with one compressive stress curve pz and two shear stress curves δx, δy.

FIG. 3 shows stress curves recorded with a device in accordance with the invention. Two fundamental phases are conspicuous:
Phase A: Fluid phase, injection
Phase B: Solidification phase, shrinkage While measurement of the compressive stress behaviour 10 is state of the art, 11 shows the shear stress curve δx, which yields previously unknown and surprising information about the solidification or shrinkage phase B. The invention exploits this information to open up entirely new possibilities.

Similar, though on much reduced scale, is the solidification shear stress δy orthogonal to δx. From these two values, after the familiar vector addition the magnitude of the maximum shear stress vector δmax and the direction angle α can be ascertained.

From the geometry of the workpiece, the expert can find the critical measuring point or points where the sensor should be placed. At the same time, he recognizes the direction in which the most dangerous solidification stresses act. In most cases, especially for production monitoring, he will therefore verify only one shear stress axis such as δx, to enable the influence of various process parameters to be assessed.

Figure 4:
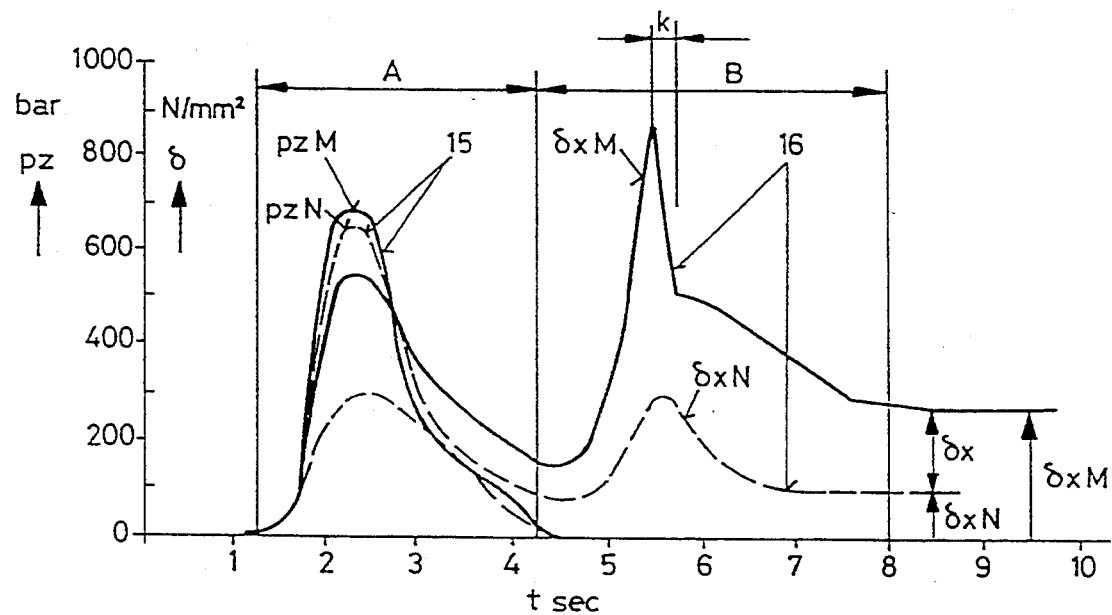
FIG. 4 A measuring diagram with one compressive stress curve pz and one shear stress curve δx for various materials M, N.

FIG. 4 shows a typical investigation of this kind with two different materials M and N. The compressive stress curves for different materials pz M and pz N are denoted by 15 and are almost identical. Very surprising, however, are the differences in the shear stress curves 16 during the solidification phase B, so that the two materials reveal considerable residual stress differences Δδx. From this it is clear that knowledge of the shear stresses opens up a new dimension with regard to quality demands. Interesting is the drop of the shear stress curve Δx M at K.

Figure 5:
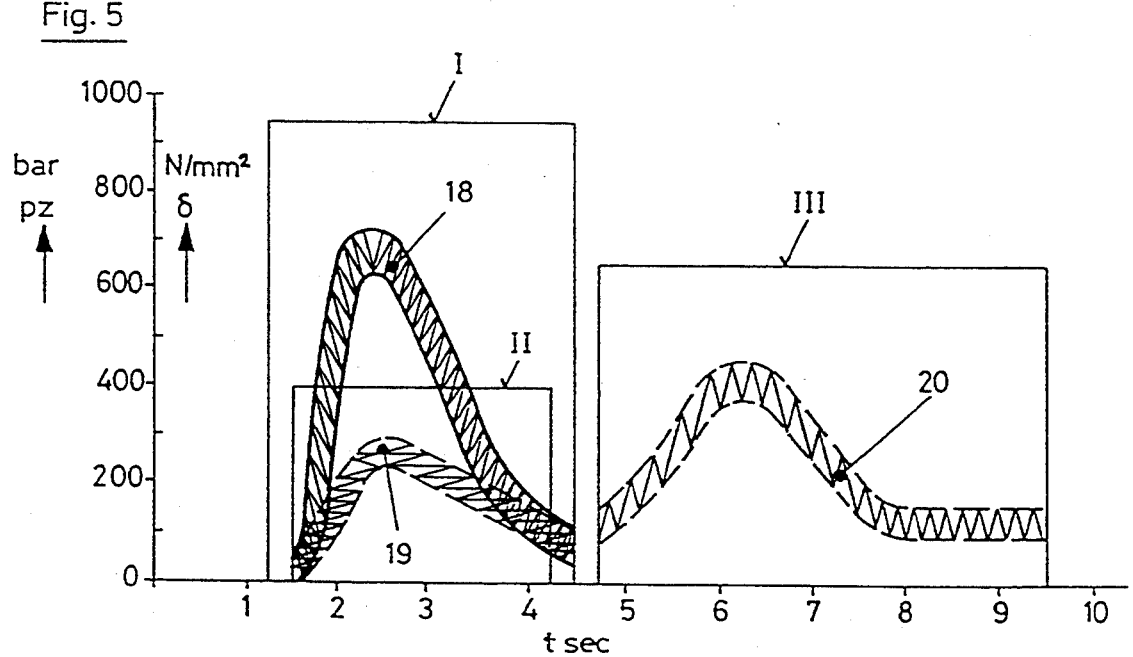
FIG. 5 A quality monitoring diagram with three assessment windows I, II and III for automatic process monitoring.

In FIG. 5 the three assessment windows I, II and III of a process-controlled injection moulding machine are explained. For this a two-component sensor pz, Δx according to the invention is mounted at the critical place. In window I the injection pressure limit curves 18 are monitored, in window II the shear stress limits 19 during the fluid phase, and in window III the limits of the shear stresses 20 during the solidification phase. On this new basis according to the invention a previously unattained quality level can be reached.

Figure 6:
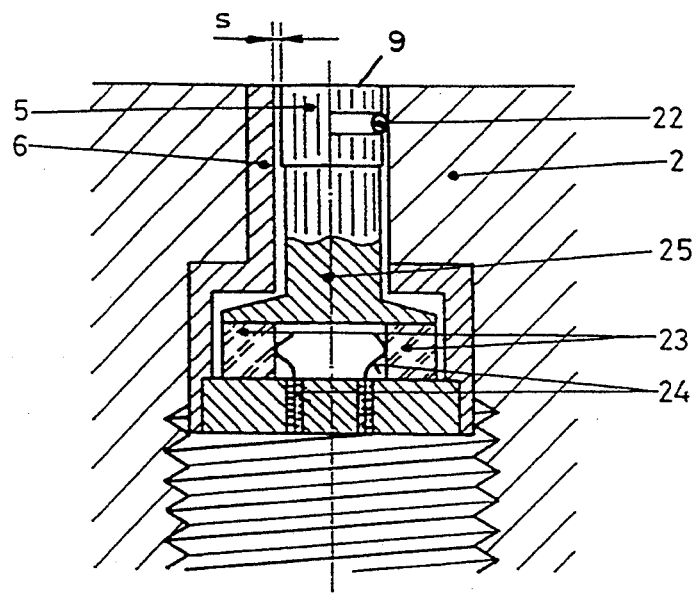
FIG. 6 A sensor according to FIG. 2 in section.

FIG. 6 shows a sensor according to FIG. 2 in section. The sensor may be fitted into the mould part 2 directly, or with the sleeve 6 which is part of the sensor 7. The clearance S may be provided in certain cases with a seal ring 22. A transmission pin 25 leads the measuring forces sustained by the sensor head 5 onto a crystal pair 23, which has like polarity, i.e. both crystal pieces 23 yield a like, i.e. negative charge on the inside when loaded in the Z direction. In accordance with the state of the art, electrodes 24 pick up the electrical charges from the metallized crystal surfaces and conduct them to connecting cable 36 (FIG. 12).

Figure 7:
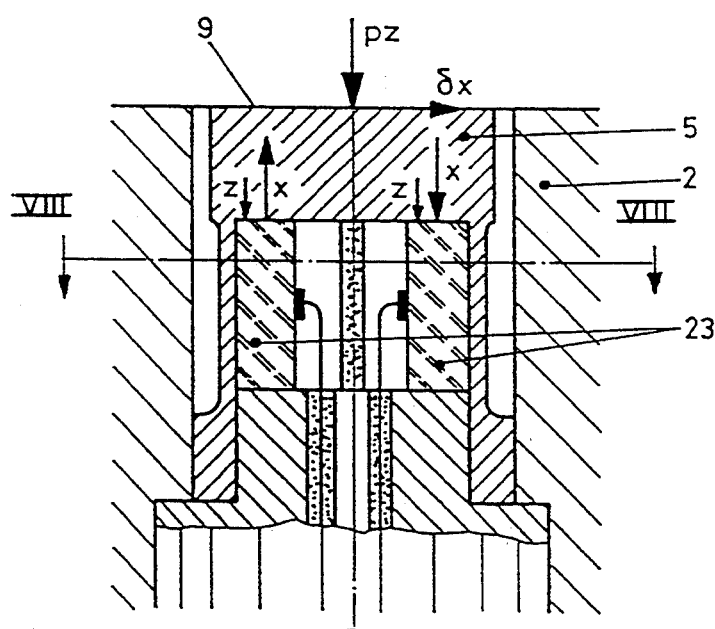
FIG. 7 A sensor similar to FIG. 6 with the measuring element accommodated in the actual sensor head 5.

FIG. 7 shows a variant to FIG. 6, with the crystal array 23 accommodated in the actual sensor head 5 itself.

Figure 8:
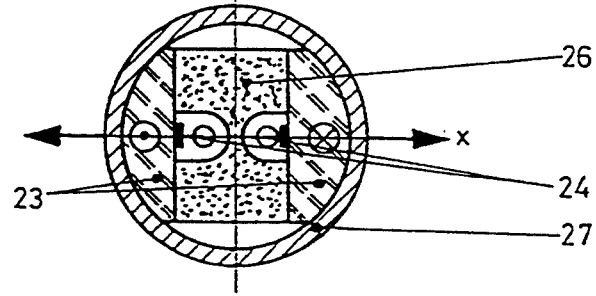
FIG. 8 Plan section to FIG. 7 at VIII—VIII.

FIG. 8 shows the plan to FIG. 7. The crystal pair 23 is separated by the filler 26, and the electrodes 24 are fitted in the filler 26.

Figure 9:
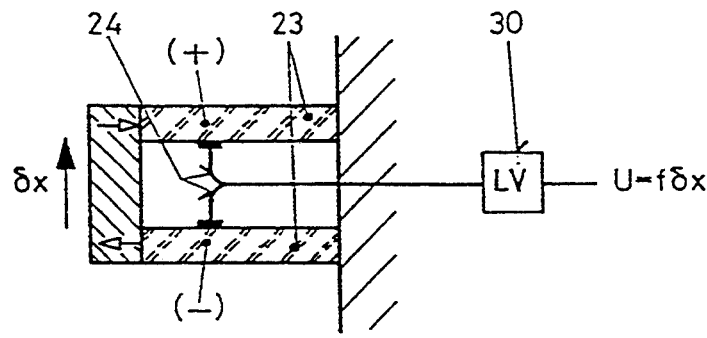
FIG. 9 Measuring rig for a single-component sensor δx.

FIG. 9 shows the measuring rig and circuitry where the sensor is to measure only one component—the shear stress δx—which is the simplest arrangement. The electrodes 24 can be interconnected and their signals led to a charge amplifier 30, which delivers an output voltage U directly. This simplification necessitates a crystal pair of unlike polarity 23 (+) (−).

Figure 10:
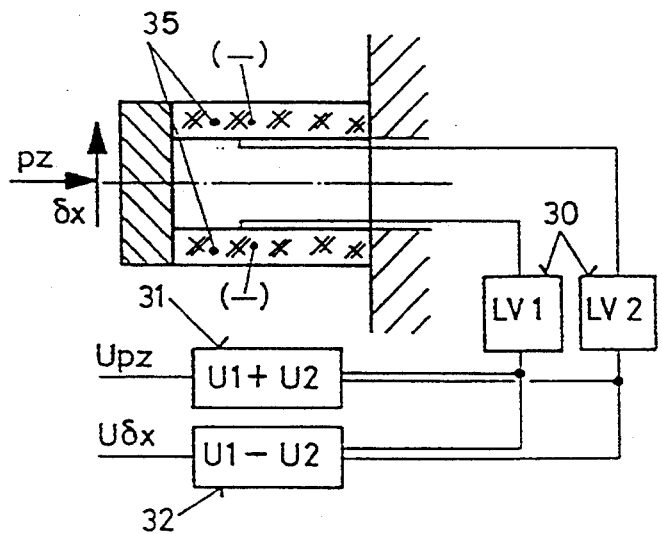
FIG. 10 Measuring rig for a two-component sensor pz, δx.

FIG. 10 shows the same configuration with two two pairs of crystals 35 of like polarity for two components pz and δx.

Figure 11:
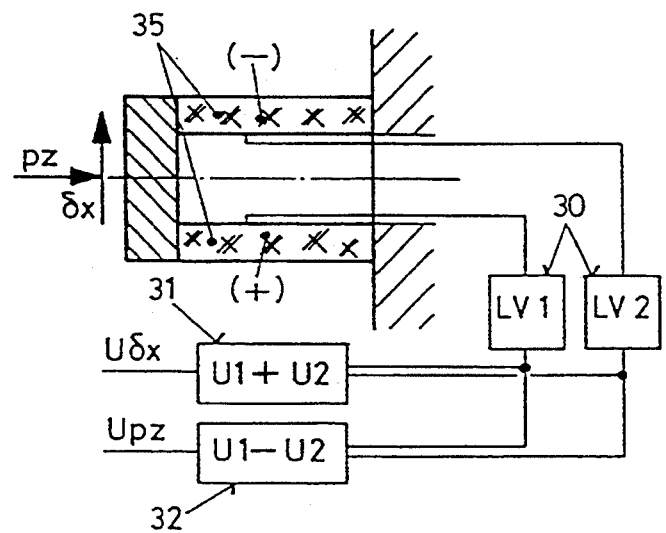
FIG. 11 Alternative measuring rig to FIG. 10.

FIG. 11 shows the configuration with two pair of crystals 35 of unlike polarity, again for two components pz and δx.

The electronic outlay on charge amplifiers 30, summing units 31 and difference unit 32 is the same in both cases.

FIG. 12 shows more clearly the electronic circuitry of the arrangement according to the invention. The simpler two-component case is illustrated, fitted with the crystal pair 23 of like polarity, e.g. in the sensor according to FIGS. 6 and 7. The two-wire, externally shielded connecting cable 36 leads to the amplifier box 33, which accommodates the two charge amplifiers 30, the summing unit 31 and the differentiator 32.

The output consists of the two signals pz and δx and the "operate" connection for switching-on the units.

Thanks to modern hybrid technique, all four subunits have small dimensions and are reliable and inexpensive due to solid-state technology.

The process and the device according to the invention for detecting material stresses will open up new possibilities above all in injection moulding technology with plastics, metals and ceramics.

Yet there are a number of other production processes in which the transition from a viscous to a solid phase causes material stresses to be set up, which likewise have defied detection till now. Here also the invention opens up entirely new avenues. With present technology piezoelectric crystal sensors can be engineered to withstand peak temperatures up to +500° C.

The examples shown can be embodied most simply with piezoelectric crystal elements, as has been illustrated, in particular with quartz elements.

However similar individual elements are possible based on piezoresistance with diffused silicon elements. Also measuring elements with thin films or strain gauges may be used. Nevertheless piezoelectric configurations are best suited on account of the simple signal pickup, and they are also the most reliable.

We claim:

1. A device for detecting material stress in castings and moldings for a material which is transformed from a liquid into a solid phase inside a mould comprising:
    a measuring surface forming part of a sensor and as part of and flush with the inner mould surface so that the sensor is able to detect at least shear forces exerted by the material; and
    a pair of sensing elements fitted directly into a sensor head and spaced along said measuring surface so that the sensor can detect said at least forces forces oriented along said measuring surface.

2. A device according to claim 1, wherein the sensor is part of a monitoring and control system for an injection moulding machine, so that the magnitude of the at least shear forces is used in the monitoring and control process of the machine.

3. A device according to claim 1, wherein the sensor head is joined to a sensor measuring element through a transmission pin.

4. A device according to claim 1, wherein the sensor has a measuring surface at right angles to the sensor's axis.

5. A device according to claim 1, wherein the sensor has a non-planar measuring surface.

6. A device according to claim 1 including a shielded double cable connecting said sensor to an amplifier housing including charge amplifiers for converting signals on said cable into voltages U1 and U2, which are then added by a summing unit and subtracted by a difference unit, and where a terminal is provided for initiating said conversion.

7. A device according to claim 1 wherein the sensing elements include quartz piezoelectric crystals.

8. A device according to claim 1, wherein the sensing elements include ceramic piezoelectric crystals.

9. A device according to claim 1, wherein the sensing elements include piezoresistive silicon crystals.

10. A device according to claim 1, wherein said sensing elements include one of a strain gauge and a thin-film device.

11. A device according to claim 1, wherein the sensor has a composite measuring surface.

12. A device for detecting material stress in castings and moldings for a material which is transformed from a liquid into a solid phase inside a mould comprising:
- a measuring surface forming part of a sensor and as part of and flush with the inner mould surface so that the sensor is able to detect at least shear stress exerted by the material; and
- a sensor head forming the measuring surface and an annular clearance between said sensor head and an inner mould wall said sensor head joined to the sensor so that said least shear stress can be transmitted onto a measuring element built into the sensor.

13. A device according to claim 12, wherein the sensor head is located in and separated from a sensor sleeve surrounding the sensor head by an annular clearance said sensor head being joined to the sensor so that the sensor can transmit both axial stresses and shear stresses onto a measuring element built into the sensor.

14. A device according to claim 13, including a seal ring between the sensor head and sensor sleeve.

15. A device according to claim 12, wherein the sensor includes a piezoelectric crystal array.

16. A device according to claim 15, wherein the crystal array has a pair of crystals.

17. A device for detecting material stress in castings and moldings for a material which is transformed from a liquid into a solid phase inside a mould comprising:
- a measuring surface forming part of a sensor and as part of and flush with the inner mould surface so that the sensor is able to detect at least one stress exerted by the material; and
- a piezoelectric crystal pair fitted directly into a sensor head and positioned so that the sensor can automatically sum vector forces oriented along two axes.

18. A device according to claim 17 wherein said sensor includes a piezoelectric crystal pair of unlike polarity interconnected by a single lead to a charge amplifier for measuring only one shear stress component.

19. A device according to claim 17 wherein the sensor includes a piezoelectric crystal pair of like polarity, each crystal being coupled with a separate charge amplifier, which in turn are connected to a summing unit and a difference unit, for measuring compressive stress component and shear stress component respectively.

20. A device according to claim 17 wherein the sensor include a piezoelectric crystal pair of unlike polarity, each crystal being coupled with a separate charge amplifier, which in turn are connected to a difference unit and a summing unit, for measuring compressive stress component and shear stress component respectively.

21. A device for detecting material stress in castings and moldings for a material which is transformed from a liquid into a solid phase inside a mould comprising:
- a measuring surface forming part of a sensor and as part of and flush with the inner mould surface so that the sensor is able to detect at least one stress exerted by the material; and
- two pairs of piezoelectric crystals connected to the measuring surface.

22. A device according to claim 21 wherein said sensor includes two pairs of piezoelectric crystals of like polarity.

23. A device according to claim 21 wherein said sensor includes two pairs of piezoelectric crystals of unlike polarity.

* * * * *